US012661674B2

(12) United States Patent
Moretti

(10) Patent No.: US 12,661,674 B2
(45) Date of Patent: Jun. 23, 2026

(54) DEVICE FOR DISPENSING A FLUID SUBSTANCE

(71) Applicant: LUMSON S.p.A., Capergnanica (IT)

(72) Inventor: Matteo Moretti, Crema (IT)

(73) Assignee: LUMSON S.p.A., Capergnanica (IT)

( * ) Notice: Subject to any disclaimer, the term of this patent is extended or adjusted under 35 U.S.C. 154(b) by 101 days.

(21) Appl. No.: 18/901,797

(22) Filed: Sep. 30, 2024

(65) Prior Publication Data

US 2025/0108395 A1 Apr. 3, 2025

(30) Foreign Application Priority Data

Sep. 28, 2023 (IT) ........................ 102023000019998

(51) Int. Cl.
*B05B 11/10* (2023.01)

(52) U.S. Cl.
CPC ................................ *B05B 11/1047* (2023.01)

(58) Field of Classification Search
CPC ............. B05B 11/1047; B05B 11/0038; B05B 11/0054; B05B 11/026
See application file for complete search history.

(56) References Cited

U.S. PATENT DOCUMENTS 6,302,607 B1 10/2001 Burrowes
2010/0044393 A1* 2/2010 Moretti .................. B29C 49/24 222/105
2010/0264166 A1* 10/2010 Moretti .................. B05B 15/30 222/105
2011/0024452 A1 2/2011 Moretti
2019/0344297 A1* 11/2019 Barenhoff ........... B05B 11/1023
2020/0376510 A1 12/2020 Erlhofer
2022/0161987 A1* 5/2022 Moretti ................ B65D 83/771
2022/0218088 A1* 7/2022 Hwang ............... B05B 11/1001
2024/0375136 A1* 11/2024 Moretti ................. B05B 11/026
2024/0375137 A1* 11/2024 Moretti ............... B05B 11/0038
2025/0099996 A1* 3/2025 Lee ......................... A45D 34/04
2025/0108395 A1* 4/2025 Moretti ................. B05B 11/026

FOREIGN PATENT DOCUMENTS

DE 9211396 U1 12/1992
EP 1433534 A2 6/2004
JP 4818867 B2 11/2011
WO 2012066716 A1 5/2012

* cited by examiner

*Primary Examiner* — Khaled Annis
(74) *Attorney, Agent, or Firm* — Dickinson Wright PLLC; Andrew D. Dorisio

(57) ABSTRACT

A device for dispensing a fluid substance comprising an outer container (2) to which a collar (3) is fastened removably, a pump (4) fastened stably to the collar (3), an inner container (5) housing a deformable bag (6) therewithin, the inner container (5) featuring a neck (5A) equipped with first means (7) for connection to the collar (3) configured to cooperate with second means (8) for connecting the collar (3) so as to removably fix the inner container (5) to the collar (3), the collar (3) and the outer container (2) being fastened removably by means of a tubular element (9) endowed with a plurality of first fins (9A) which secure the collar (3) to the tubular element (9) and second fins (9B) which secure the outer container (2) to the tubular element (9).

11 Claims, 5 Drawing Sheets

DEVICE FOR DISPENSING A FLUID SUBSTANCE

This application claims priority to Italian Patent Application for Invention No. 102023000019998 filed on Sep. 28, 2023, the disclosure of which is hereby incorporated by reference.

FIELD OF THE INVENTION

The present invention relates to a fluid substance dispensing device.

In particular, it refers to a device for dispensing a fluid substance in which at least part thereof is refillable (once emptied) or reusable.

STATE OF THE ART

There are commonly known devices for dispensing fluid substances, such as creams or the like, which comprise a container and a hand pump coupled thereto. The activation of the pump allows the dispensing of a predetermined amount of fluid substance.

In some cases, the fluid substance is housed inside a deformable bag and the pump is of the airless kind. This way, the substance contained in the deformable bag is not contaminated by the outside air.

When all the substance contained in the commonly known devices has been dispensed, the said devices are thrown away.

In some cases, filling systems may be envisaged, which however force the consumer to perform difficult and far from simple operations.

In any case, even if refilling is possible, the commonly known devices are thrown away at the end of their life.

US 2011/024452 and JP 4 818867 describe known devices.

SUMMARY OF THE INVENTION

The object of the present invention is to provide a device which is improved compared with the prior art.

A further object of the invention is to provide a device which, once all the fluid substance has been dispensed, can comprise at least one part that can be put to a different use from that for which the said part was originally designed.

This and other objects are achieved by means of a dispensing device according to the technical teachings of the claims appended hereto.

Advantageously, the device can be refilled before the said part is reused.

Even more advantageously, the refilling procedure is made simple and fast, and is designed to minimise the risk of malfunction of the pump.

BRIEF DESCRIPTION OF THE FIGURES

Further features and advantages of the innovation will become clearer in the description of a preferred but not exclusive embodiment of the device, illustrated—by way of a non-limiting example—in the drawings appended hereto, in which.

DETAILED DESCRIPTION OF THE INVENTION

Figure 1:
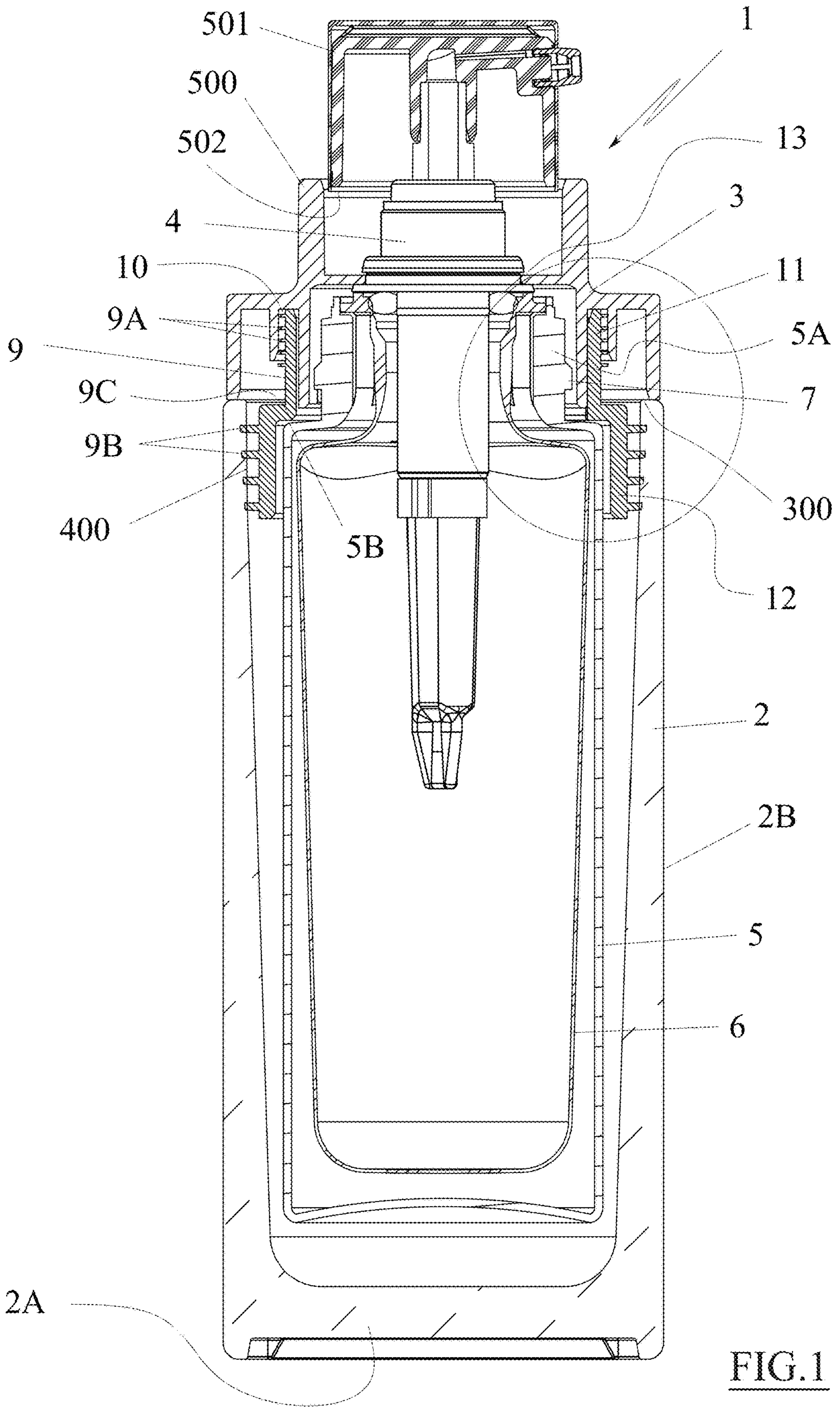
FIG. 1 is a partial axial section view of a device according to the present invention.

With reference to the figures stated, reference number 1 is used to denote, as a whole, a fluid substance dispensing device.

In this document, the term 'fluid substance' can mean a variably dense liquid, such as a cream or a sprayable substance, which is preferably used in the cosmetic or medical fields.

The device for dispensing a fluid substance comprises an outer container 2 to which a collar 3 is fixed removably, a pump 4 fixed stably to the collar 3, and an inner container 5 which houses a deformable bag 6 therewithin.

The collar 3 may include a tubular projection 500 which houses, in an essentially telescopic manner, a dispensing button 501 coupled with a stem of the pump 4, preferably so that a lower edge 502 of the dispensing button 501 is hidden, when the said button is in an upper stroke-end position.

The inner container 5 may be decoupled from the collar 3 for a refilling procedure.

Figure 8:
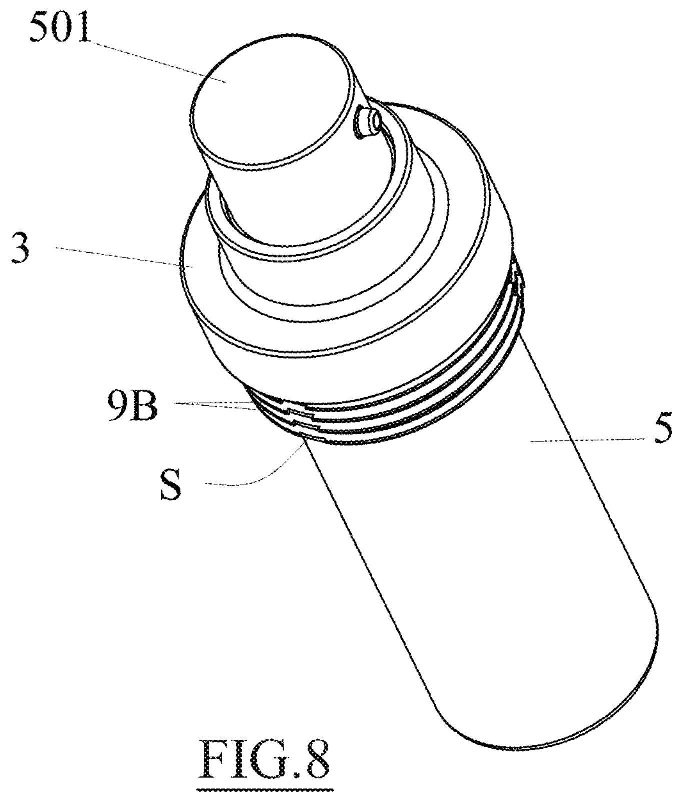
FIG. 8 is a perspective view of the device in FIG. 1 without the outer container.

Advantageously, once the contents of the bag 6 have been used up entirely, the outer container 2 can be separated from the collar 3, also taking away the inner container 5 and the deformable bag 6 contained inside it (FIG. 8).

At this point, inner container 5 is separated (for example by unscrewing it) from the collar and a new inner container 5 with a full deformable bag 6 is coupled to the collar 3.

The outer container 2 may feature a bottom 2A and a side wall 2B.

The bottom 2A (or base) and the side wall 2B are preferably made as a single piece of glass.

If the outer container 2 is made of metal or wood, it is also possible for the side wall and the bottom to be made as two separate pieces which are subsequently assembled in an essentially immovable manner.

The outer container may be internally or externally decorated, also with embossment and/or reliefs.

The side wall 2B features a free end 300 which forms an opening 400 (or mouth) in the outer container 2.

The side wall 2B, especially on the inner face thereof, is preferably (totally) devoid of any depressions or macroscopic reliefs which are functional to coupling with the collar 3.

Therefore, at an area of interconnection with the tubular element 9 that allows coupling with the collar 3 (as will be described later), the outer container 2 is devoid of protrusions or recesses which are functional to coupling with the said tubular element 9.

As an exception, as already said, decorative recesses or protrusion may be present in this area.

In this way the outer container 2, once decoupled from the collar 3, can be used as a glass, a vase, or a generic container, for example at the end of the device's life or when one no longer intends to refill the device with a new inner container 5.

Advantageously, the side wall 2B of the outer container 2 is cylindrical or polygonal (for example square, hexagonal, etc.). The base 2A can have a conformation which corresponds to the perimeter of a cross-section of the side wall 2B.

Advantageously, the opening 400 formed at the free end of the side wall 2B has a surface area which is comparable to or slightly greater than that of the base 2A.

The side wall 2B can therefore be tapered towards the base 2A, with the side wall 2B slightly frusto-conical.

It should be noted that the outer surface of the side wall 2B may feature reliefs or depressions which, however, have a purely decorative purpose and are not functional to coupling with the collar 3.

Therefore, the outer part of the side wall 2B may also be finely decorated, including therein with decorations in relief.

The inner container 5, which is preferably made of plastic, has a neck 5A equipped with first means 7 for connection to the collar 3, the said means being configured to cooperate with second means 8 for connecting the collar 3 so as to fix the inner container 5 to the collar 3 removably.

Figure 7:
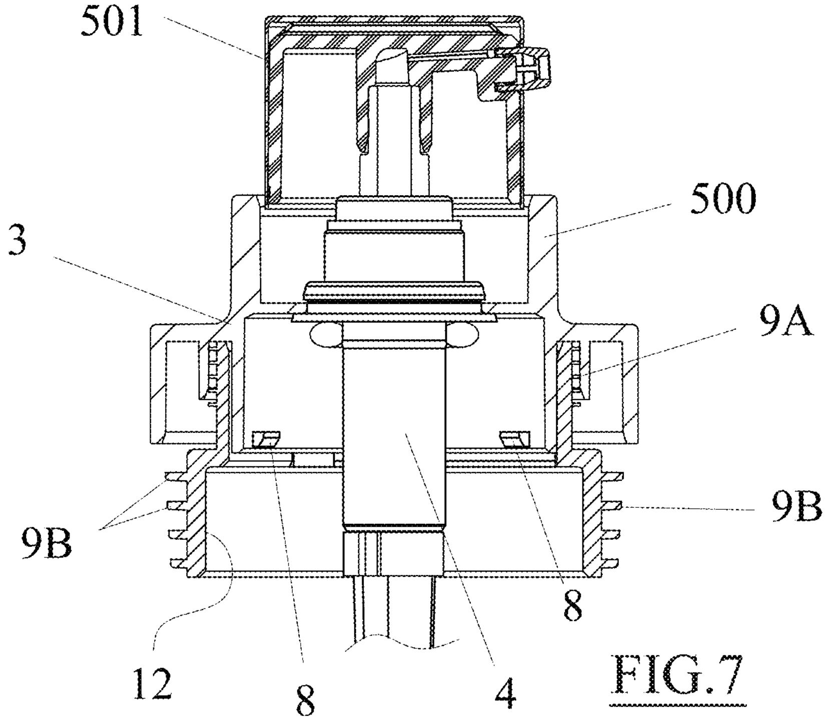
FIG. 7 is the sectional view in FIG. 1, minus certain details, more specifically without the outer container and the inner container.

The second means are clearly visible in FIG. 7. The said means are essentially teeth protruding from the collar 3, of which there are preferably three.

Figure 12:
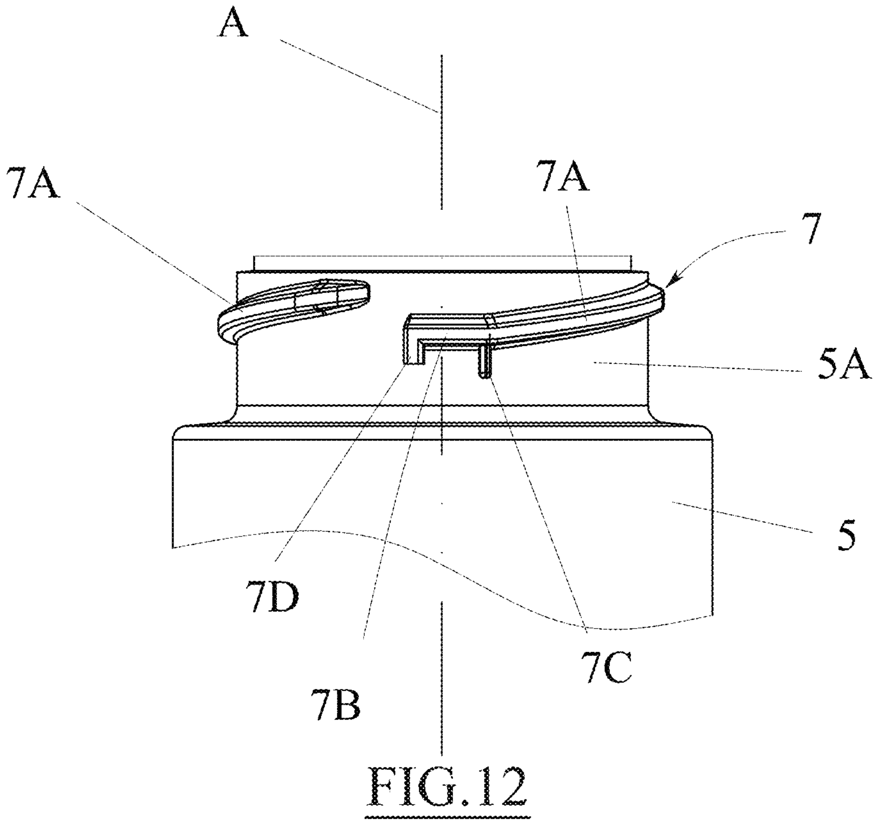
FIG. 12 is a side view, minus certain details, of an inner container of the device in FIG. 1.

The first means 7, i.e. those on the inner container 5, are clearly visible in FIG. 12. Preferably, the said means consist of a thread.

The thread may feature an inclined part 7A that ends in an essentially horizontal part 7B (or rather which is perpendicular to an axis A of the inner container 5).

The essentially horizontal part 7B is extremely useful for pre-setting the maximum load provided by the coupling with the collar, so as to apply load to the sealing means 13, 14, 18 (which will be described later) in order to guarantee a perfect seal thereof.

This facilitates normal pump operation when the inner container 5 is replaced by the user during a refilling procedure.

Advantageously, the second means 7 also feature a relief 7C which, when cooperating with a tooth 8 on the collar, produces a snap that is clearly perceived by the user.

Therefore, when the user perceives the snap, they understand that the tightening procedure is complete and the seal is guaranteed.

The relief 7C is preferably positioned at the essentially horizontal part 7B, or at a transition zone between the essentially horizontal part 7B of the thread and the inclined part 7A of the thread.

Advantageously, the second means 7 can also feature a stop 7D, which, once the said means are tightened, intercepts a tooth 8, thereby preventing further rotation of the collar 3 with respect to the inner container 5.

The collar 3 and the outer container 2 are fixed removably by means of a tubular element 9 endowed with a plurality of first fins 9A which secure the collar 3 (by bending) to the tubular element 9 and with second fins 9B which secure the outer container 2 (also by bending) to the tubular element 9.

Therefore, the tubular element 9 is preferably a separate piece with respect to the collar 3 and also, obviously, with respect to the outer container 2.

The tubular element is preferably made of: relatively soft plastic material such as LDPE, RUBBER, SILICONE, SANTOPRENE, TPE, TPO, TPU, and SEBS.

Furthermore, when the inner container 5 is fixed to the collar 3 (as for example in FIG. 8), a first part 5B (FIG. 1) of the inner container 5 rests on a second part 9C of the tubular element 9 so as to keep the tubular element 9 coupled to the collar 3 permanently.

Indeed, the tubular element 9 is positioned between the inner container 5 and the collar 3, and is therefore locked in place.

This is particularly useful when disassembling the collar 3 from the outer container 2.

By pulling the collar 3 away from the outer container 2, to separate the outer container 2, the tubular element remains perfectly locked onto the collar 3 thanks to the presence of the inner container 5, which is screwed to the said collar.

For fastening to the tubular element, the collar 3 can determine a groove 10 inside which one end of the tubular element 9 engages, where the said first fins 9A are present.

Figure 2:
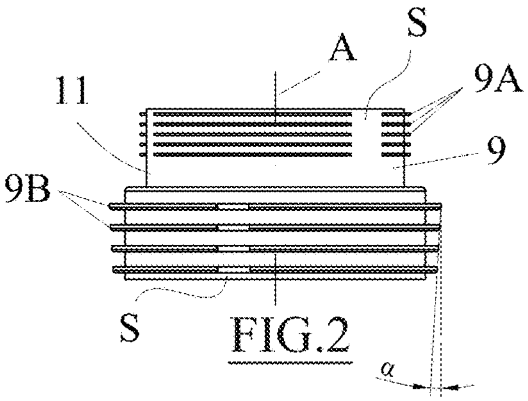
FIG. 2 is a detail, in a side view, of a part of the device in FIG. 1.
Figure 3:
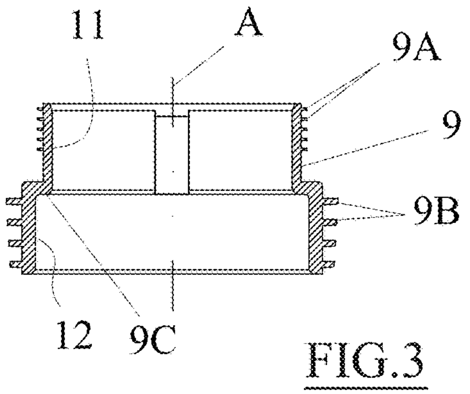
FIG. 3 is an axial sectional view of the detail in FIG. 2.
Figure 4:
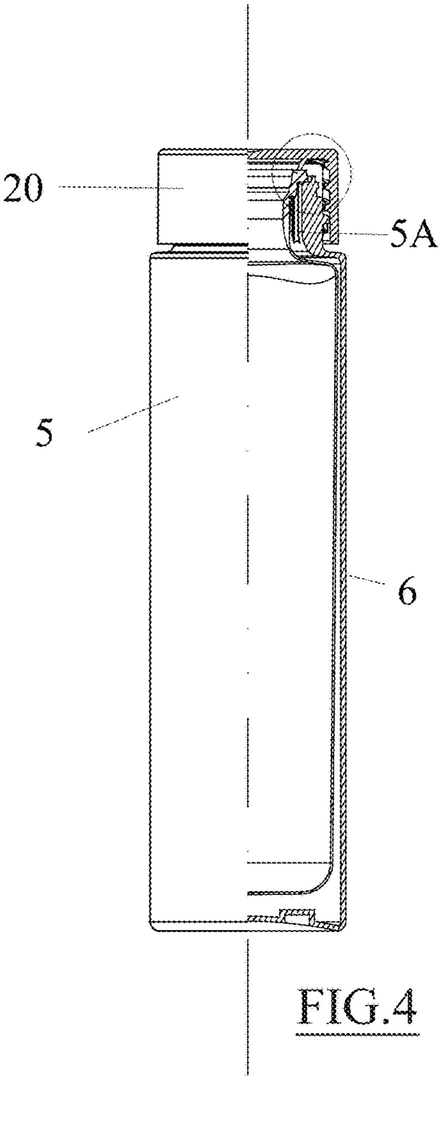
FIG. 4 is a refill for the device in FIG. 1 before being coupled with the device.
Figure 5:
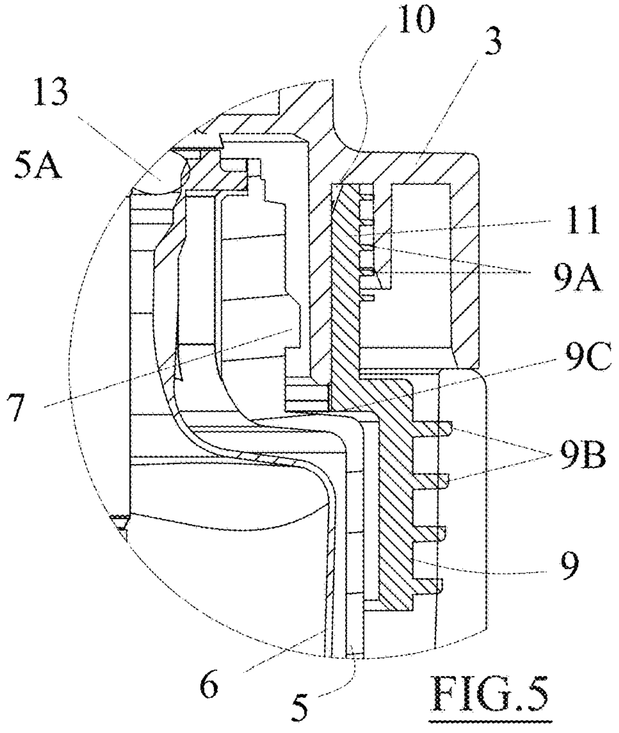
FIG. 5 is an enlargement of the detail circled in FIG. 1.

Advantageously, as clearly visible in FIGS. 2 and 3, a first portion 11 of the tubular element 9 featuring the said first fins 9A has a smaller diameter than that of a second portion 12 of the tubular element 9 featuring the second fins 9B.

The second part 9C (the part resting on the inner container 5) is made in correspondence with a connecting portion between the first portion 11 and the second portion 12 of the tubular element 9.

Advantageously, the first fins 9A (and the second fins 9B) extend perpendicularly to the axis A of the tubular element (which coincides with the axis A of the device 1, of the inner container 5, and of the outer container 2).

Optionally, the outer surface determined by the second fins (i.e. the one that works on the inner surface of the outer container 2 at the mouth 400 thereof) can have a slight conicity a of between 0.5° and 5°, preferably 3°; therefore, the second fins may not all have the same extension.

The number of second fins 9B may be less than the number of first fins 9A.

In the example in FIG. 1, four second fins are envisaged.

Advantageously, the outer surface of the second fins 9B may feature vents S for trapped air, for example, air trapped in the outer container 2 during coupling with the collar.

The vent S may also be envisaged in another position of the second fins 9B and may also be envisaged for the first fins 9A as shown in FIG. 2.

Possibly the fins 9B may feature other kind of air passages, like through holes (not shown) made on the surface of the second fins 9B.

Through holes may be in addition to the vents S, or may be the only passages to vent the trapped air.

A sealing element 13, 14, 18 is envisaged between the pump 4 (which may be of the airless type) and the deformable bag 6.

The sealing element may be of the conventional kind, therefore essentially an O-ring 13 coupled with the pump, or better with the pump body 4A.

In this case, the O-ring 13 remains coupled with the pump during the refilling procedure.

To improve the effectiveness of the sealing element 14, 18 even after coupling the pump 4 with the refills several times, the said pump can be secured to the inner container 5 (as in FIG. 10) or to the deformable bag 6 (as in FIG. 9), so as to be uncoupled from the pump 4 when the inner container 5 is separated from the collar 3.

Therefore, upon insertion of each new refill, the sealing element remains new.

Figure 10:
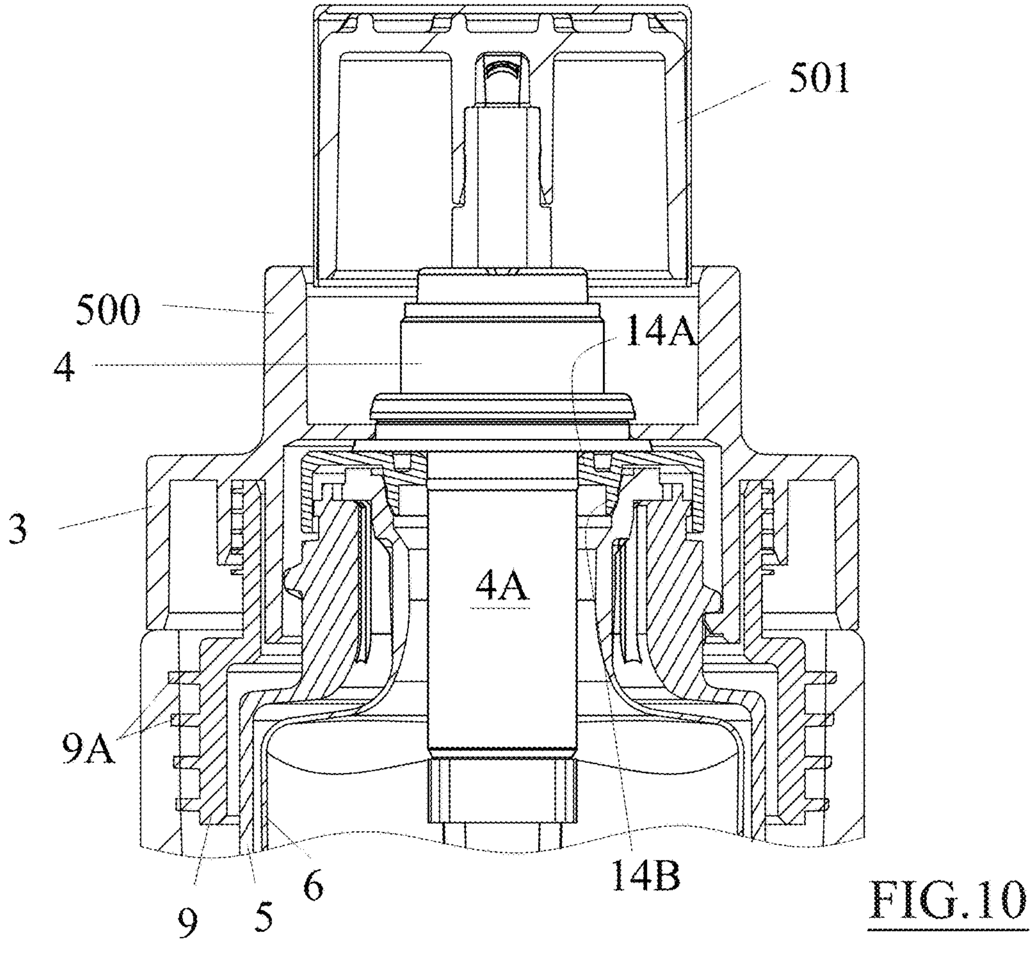
FIG. 10 is a partial axial section view showing a possible system for sealing the device in FIG. 1.

In the example in FIG. 10, the sealing element 14 is fastened, for example by snap-on or undercut means, to the neck 5A of the inner container 5, and features a first sealing lip 14A on a body 4A of the pump 4 and a second sealing lip 14B on a neck of the deformable bag 6.

The sealing element 14 therefore is discoid and all the diametrical sections thereof are identical to that shown in FIG. 10.

Figure 9:
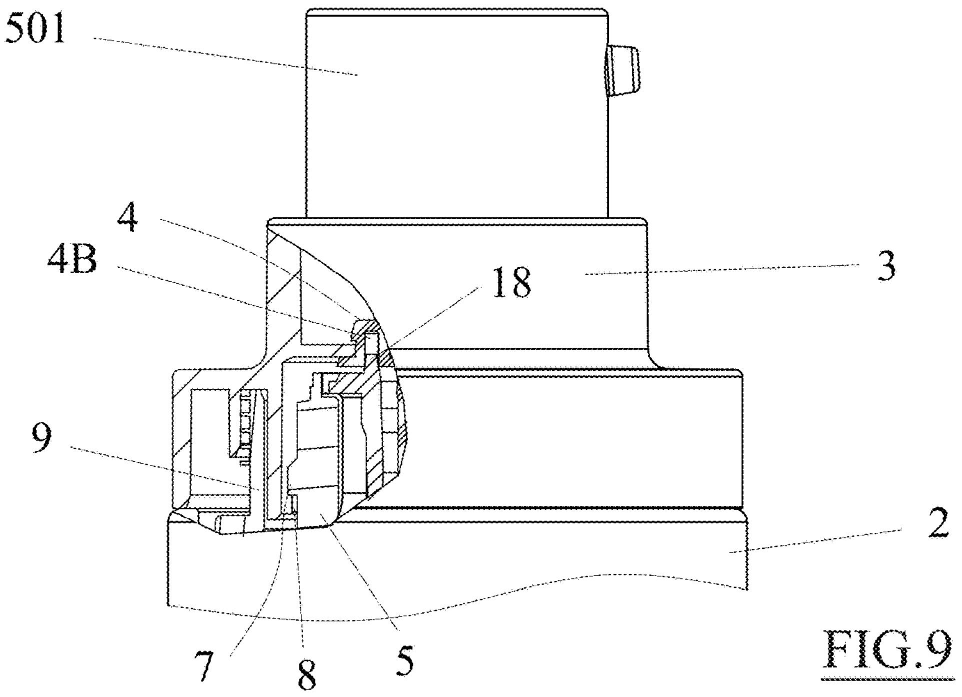
FIG. 9 is a partially sectioned side view showing a possible system for sealing the device in FIG. 1.

In the example in FIG. 9, however, the sealing element 18 is obtained as a single piece with the deformable bag 6 and engages in a sealed manner in a specifically provided groove 4B in the pump 4.

To complete the previous description, it must be underlined that, when the outer container 5 is uncoupled from the collar 3, for example when used as a refill, it can feature a removable cap 20 endowed with a thread 22 that cooperates removably with the said first connection means 7.

Figure 6:
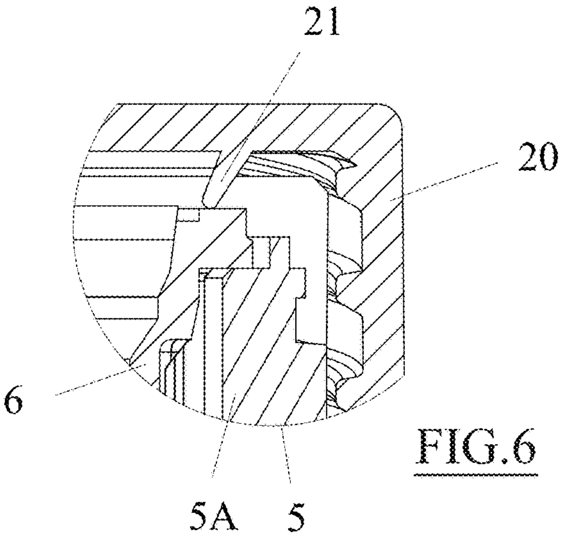
FIG. 6 is an enlargement of the detail circled in FIG. 4.
Figure 11:
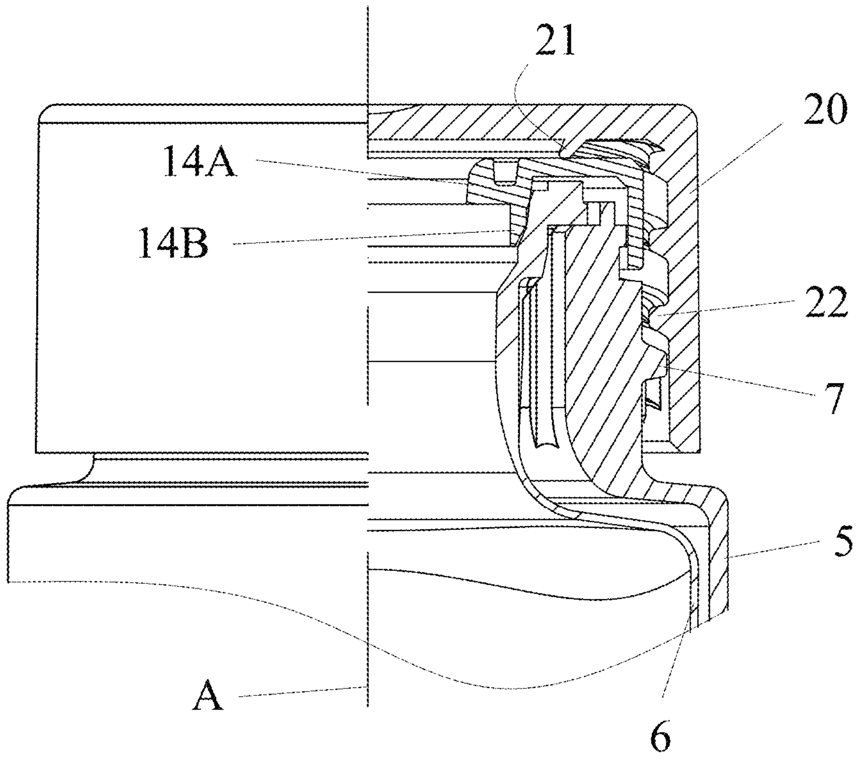
FIG. 11 is a partially sectioned, partial side view, of a refill for the device of FIG. 10 before being coupled with the device.

Furthermore, the removable cap 20 can be equipped with a protrusion 21 that cooperates in a sealed manner with the deformable bag 6 (as in FIG. 6) or with the sealing gasket 14 (as in FIG. 11).

Various embodiments of the innovation have been disclosed herein, but further embodiments may also be conceived using the same innovative concept.

The invention claimed is:

1. A dispensing device (1) of a fluid substance comprising an outer container (2) to which a collar (3) is removably attached, a pump (4) stably attached to the collar (3), an inner container (5) housing a deformable bag (6) therein, the inner container (5) having a neck (5A) envisaged with first means (7) of connection to the collar (3), the first means (7) being configured to cooperate with second means (8) of connection of the collar (3) so as to removably attach the inner container (5) to the collar (3), the collar (3) and the outer container (2) being removably fixed trough a tubular element (9) provided with a plurality of first fins (9A) constraining the collar (3) to the tubular element (9) and second fins (9B) constraining the outer container (2) to the tubular element (9).

2. The device according to the claim 1, wherein, when the inner container (5) is fixed to the collar (3), a first part (5B) of the inner container (5) encounters a second part (9C) of the tubular element (9) so as to keep the tubular element (9) permanently associated with the collar (3).

3. The device according to claim 1, wherein the collar (3) defines a groove (10) in which an end of the tubular element (9) is engaged wherein said first fins (9A) are present.

4. The device according to claim 1, wherein a first portion (11) of the tubular element (9) wherein said first fins (9A) are made, has a smaller diameter than that of a second portion (12) of the tubular element (9) wherein said second fins (9B) are made.

5. The device according to claim 1, wherein said second part (9C) is made in correspondence with a connecting portion between the first portion (11) and the second portion (12) of the tubular element (9).

6. The device according to claim 1, wherein a sealing element (13, 14, 18) is provided between the pump (4) and the deformable bag (6).

7. The device according to claim 1, wherein the sealing element (14) is constrained to the inner container (5) or the deformable bag (6), so as to get removed from the pump (4) when the inner container (5) is separated from the collar (3).

8. The device according to claim 7, wherein the sealing element (14) is snap-fitted to the neck (5A) of the inner container (5), and has a first sealing lip (14A) on a body (4A) of the pump (4) and a second sealing lip (14B) on a neck of the deformable bag (6).

9. The device according to claim 7, wherein the sealing element (18) is made in a single piece with the deformable bag (6) and is sealingly engaged in a groove (4B) of the pump (4).

10. The device according to claim 1, wherein the outer container (2) at an interconnection zone with the tubular element (9) is free of protrusions or recesses functional for coupling with the tubular element (9).

11. The device according to claim 1 wherein, when the inner container (5) is decoupled from the collar (3), it has a removable cap (20) provided with a thread (22) which couples to said first means (7) of connection, the removable cap (20) being provided with a protrusion (21) which cooperates in a sealing manner with the deformable bag (6) or with the sealing element (14).

* * * * *